March 1, 1960
F. E. PORAMBO
2,926,597
AUTOMATIC CRULLER MACHINE
Filed May 24, 1956
2 Sheets-Sheet 1
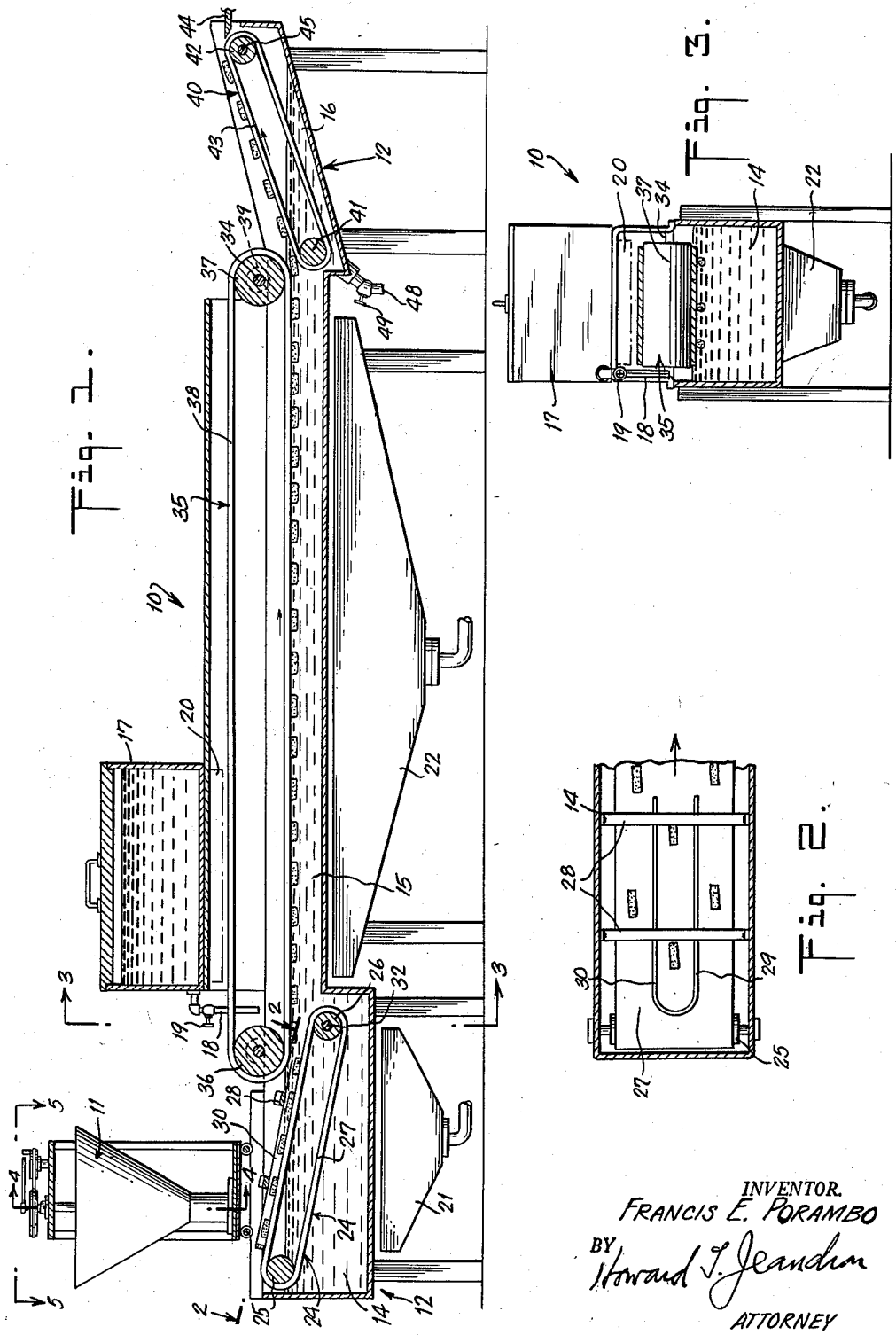
INVENTOR.
FRANCIS E. PORAMBO
BY
Howard J. Jeandron
ATTORNEY March 1, 1960 F. E. PORAMBO 2,926,597
AUTOMATIC CRULLER MACHINE
Filed May 24, 1956 2 Sheets-Sheet 2

INVENTOR.
FRANCIS E. PORAMBO
BY
ATTORNEY

United States Patent Office 2,926,597
Patented Mar. 1, 1960

2,926,597

AUTOMATIC CRULLER MACHINE

Francis E. Porambo, South Plainfield, N.J., assignor to Franchett's Crullers, Inc., Metuchen, N.J.

Application May 24, 1956, Serial No. 587,106

5 Claims. (Cl. 99—353)

This invention relates to an automatic cruller producing machine and more particularly to a series of components which transform a dough mixture into a plurality of crullers in a continuous operation in which the dough is cut into an exact quantity, the cut off dough is carried into a pre-heated shortening where the dough is transformed in a cooking operation into a cruller, and in which the cruller is advanced during the cooking operation in the shortening to complete the transformation, and in which the completely cooked cruller is carried out of the shortening and thoroughly drained and ejected from the device as a finished cruller. Although the prior art discloses automatic cruller manufacturing devices, the general arrangement, that is, the components for handling the dough, are different in structure and the method of handling the dough is different, and the transformed dough is submerged to a greater degree, producing a far greater fat absorption during the cooking process, resulting in a cruller that has inferior characteristics, namely, too great a fat absorption.

An object of this invention is to provide an automatic cruller manufacturing device in which the dough mixture is automatically handled to provide a continuous formation of a predetermined amount of dough and in which the dough is automatically introduced into the pre-heated shortening and in which the partially cooked cruller is carried forward at or about the surface of the shortening to finish the cooking operation and in which the completely cooked cruller is removed from the shortening and properly drained and ejected from the device.

A further object of this invention is to provide an automatic cruller forming and cooking device in which the cruller dough is introduced into the shortening and retained in the shortening for a predetermined minimum degree of time and at or near the surface of the pre-heated shortening to provide a finished cruller with a minimum of fat absorption.

A still further object of this invention is to provide a dough handling device for an automatic cruller machine in which the dough handling device may be loaded with a prepared cruller mixed dough and in which the device may be rolled into an operating position and, further, in which the device will automatically feed the dough through a cut-off gate and, further, in which the cut-off gate is controlled to provide a plurality of exact proportions of dough for each cut-off operation.

Other objects of this invention shall be apparent by reference to the accompanying detailed description and the drawings in which—

Fig. 1 illustrates a side elevational view of the apparatus partly in cross-section;

Fig. 2 illustrates a plan view taken on line 2—2 of Fig. 1;

Fig. 3 illustrates an elevational view, partly in cross-section, taken on line 3—3 of Fig. 1;

Figure 4:
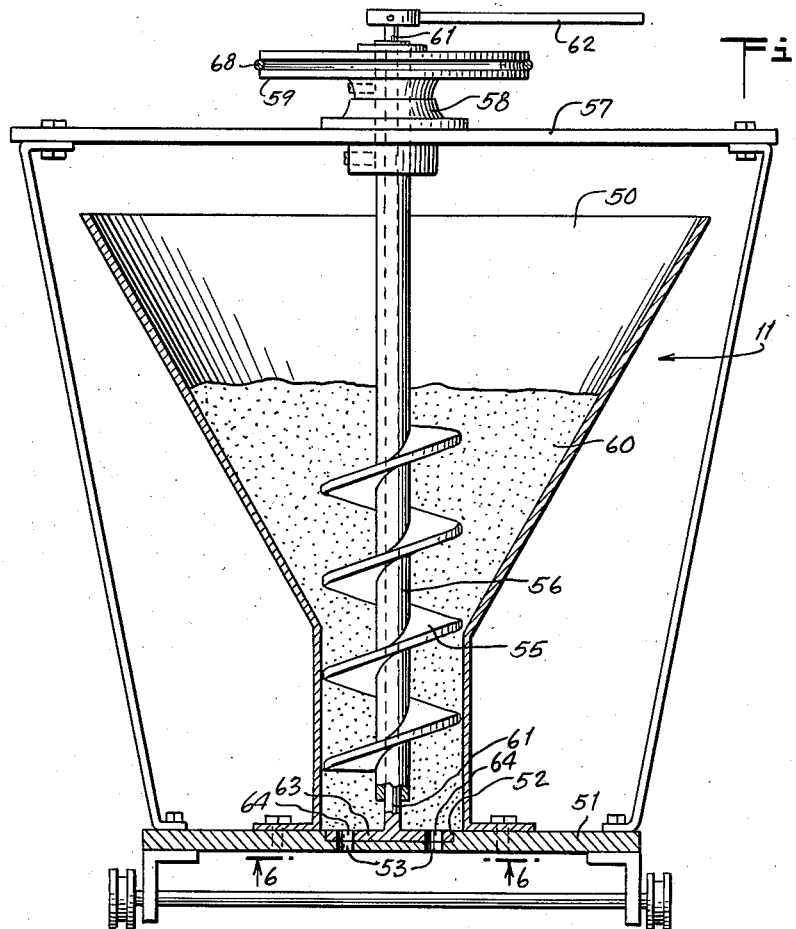
Fig. 4 is an enlarged view partially in cross-section taken on line 4—4 of Fig. 1.

Referring to the drawings and particularly Fig. 1, there is illustrated a cruller manufacturing device 10 which includes an automatic dough feeding funnel 11, mounted on wheels 9, the wheels 9 being fitted to a pair of rails 8 that form a track, a shortening tank 12 which is divided into a deep fat cooking portion 14, a shallow fat cooking portion 15, and a fat draining portion 16. A shortening tank 17 is mounted above the tank 12. Tank 17 is connected by means of a pipe 18 with a shut-off valve 19 so that the shortening may be drained from tank 17 into tank 12 and the amount of shortening may be controlled by the valve 19. In order that the shortening in tank 17 will flow freely, a gas heater 20 may be mounted directly under tank 17. A gas heater 21 is mounted under the deep fat portion 14 of tank 12 and a gas heater 22 is mounted under the shallow fat portion 15 of tank 12. A continuous conveyor 24 is mounted in the portion 14 of tank 12. The conveyor is mounted to rotate about a pair of drums 25 and 26. It is to be noted drum 25 is mounted near the top of portion 14 so that a portion of the conveyor will actually be out of the fluid (fat) and that the drum 26 is mounted well below the surface of the fat. The conveyor consists of a belt 27 which may be of metal or any suitable substance which will sustain the temperature without harmful effects on the belt itself. The belt must remain flexible and durable to withstand a continuous operation. A framework 28 (Fig. 2) is mounted across the upper portion 14 of tank 12 to retain a pair of strips 29 and 30 in spaced relation. As a practical matter, the strip is formed of a single strip but bent back upon itself, as illustrated in Fig. 2. The strips 29 and 30 are affixed to the framework 28 and lie in a parallel relationship to the angle or plane of the top surface of the conveyor belt 27. They are provided so that as the cruller dough is cut off in three lumps for each operation, the lumps or portions of dough will drop into the three consecutive channels formed on the conveyor by strips 29 and 30. Thus, the portions of dough are properly segregated from each other during the initial cooking operation to prevent one portion from adhering to another portion. After the portions of dough have been carried by the conveyor 25 into the shallow portion 15, there is no further danger of the portions adhering to each other. Therefore, the strips 29 and 30 do not extend beyond the conveyor 24. In order that conveyor 24 may be rotated as desired, either of the drums 25 or 26 may be used as the driving element. In this instance, drum 26 is connected through its shaft 32 which extends through the tank 12 to a reduction gear and motor (not shown) to maintain the movement of the conveyor at a predetermined speed during its operation. A second conveyor 35 is mounted above the portion 15 of tank 12 and comprises a pair of drums 36 and 37 mounted in parallel relationship at either end of the shallow portion 15. A conveyor belt 38 is mounted to rotate about drums 36 and 37, as illustrated in Fig. 1. The conveyor is mounted so that the lower surface of the conveyor belt will move and remain just slightly below the normal operating surface of the heated shortening to thus keep the partially cooked crullers below the surface of the shortening while carrying the crullers through a frictional contact with the belt through the portion 15 of tank 12 and allowing the completely cooked crullers to bob up towards the surface of the shortening liquid at the end of their travel. The conveyor 35 is driven by either of the drums 36 or 37. In this instance drum 37 is utilized, drum 37 being mounted on a shaft 38. Shaft 38 passes through a pair of bearings 39 at either edge of the tank and shaft 38 is connected to a reduction gear and motor (not shown) to provide a predetermined continuous speed of operation. A third conveyor 40 is provided in the portion 16 of tank 12. The conveyor consists of a pair of drums 41 and 42 with a conveyor belt 43 mounted to rotate about the drums. It is to be noted that drum 41 is mounted below the level of the shortening in the tank and slightly below the end of the second conveyor so that the cooked crullers will be ejected onto the surface of the conveyor belt 40. It is to be noted that drum 42 is mounted well above the level of the shortening so that the conveyor 40 will emerge from the fat or shortening carrying the crullers upward and allowing the crullers to drain while being carried upward. A platform 44 may be mounted in juxtaposition to the conveyor belt at its highest point so that the completely cooked and drained crullers will be ejected onto the platform 44 where they are moved by means (not shown) for packaging. It is to be understood that a conveyor belt 40 will also be driven by means of the drum 42 mounted on a shaft 45, the shaft 45 passing through either side of the portion 16 of tank 12 and shaft 45 being connected to a reduction gear and motor (not shown) to drive the conveyor at a predetermined desired continuous speed. It is also to be noted that the portion 16 of tank 12 is provided with an outlet or drain 48 and a shut-off valve 49. This is to permit draining the fat or shortening but due to its location with a slight drop in the tank 16 below the portion 15, any particles, break-off from the crullers, or hard portions formed in the shortening will settle at the drain 48 and may be easily removed.

Referring to Fig. 4, an enlarged detail of the dough handling and feeding device 11 is illustrated. The device 11 is primarily a funnel 50 mounted on a base plate 51. The base plate 51 is provided with a circular cut-out portion 52 that does not go completely through plate 51. In the cut-out portion 52 there are provided three apertures 53 spaced in equal proportion from each other. A feed screw 55 is mounted in the funnel 50 and the diameter of the screw is made to comply with the internal diameter of the neck of the funnel 50 so that the screw 55 will fit down through the neck of the funnel. Screw 55 is mounted on a hollow shaft 56. The hollow shaft 56 extends upward through a supporting frame 57 and bearing 58 and is provided with a pulley wheel 59 to permit driving the screw 55 in a clockwise direction so that it will force a quantity of dough 60 in a continuous movement towards the mouth of the funnel. A shaft 61 extends through the hollow shaft 56 at its upper end above the pulley 59. There is a crank arm 62 affixed or keyed to shaft 61. At the lower end of shaft 61 there is a circular plate 63 formed or affixed to shaft 61. The circular plate 63 is of a diameter to fit the cut-out portion 52 already described. Plate 63 is also provided with three apertures 64 spaced exactly the same as the apertures 53 of plate 51 and equivalent in size to apertures 53 so that they may be aligned as illustrated, to thus provide a passage for the dough 60 as it is forced downward by the feed screw 55. It is apparent that with the movement of arm 62 shaft 61 will be rotated which, in turn, will rotate plate 63 and move the apertures 64 out of registration with the apertures 53. In such operation the dough 60 will be cut off and cannot feed through the apertures 53 until arm 62 is returned to a predetermined position providing the necessary alignment of apertures 64 and 53.

Figure 5:
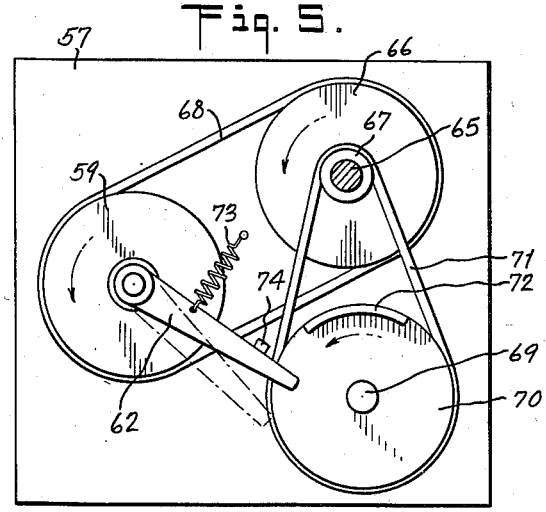
Fig. 5 is a plan view taken on line 5—5 of Fig. 1.
Figure 6:
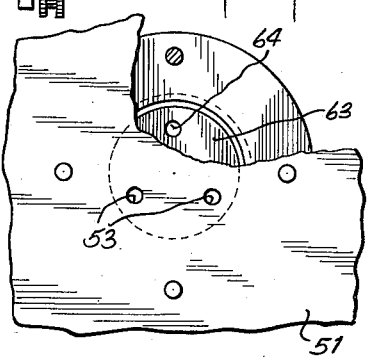
Fig. 6 is a partial detail of the cut-off valve taken on line 6—6 of Fig. 4.

Referring to Fig. 5 there is illustrated the driving mechanism for the feed screw 55 and the cut off arm 62. A motor (not shown) is mounted above the frame 57 and may be supported by frame 57. The motor, by means of its drive shaft 65, will be connected to a pair of pulleys 66 and 67. With pulley 59 extending above the frame 57 and pulley 59 being positioned in a parallel plane with pulley 66, a belt 68 may be passed around both pulleys so that the motor (not shown) will drive pulley 59 and, of course, in turn, the feed screw 55. A shaft 69 is also mounted to extend above frame 57 and is provided with a pulley 70 mounted thereon. Pulley 70 will be mounted in a plane with pulley 67 and a drive belt 71 may be mounted to rotate about both pulleys so that the motor will drive pulley 70 as illustrated in Fig. 5. Pulley 70 is provided with a raised portion 72 on the upper surface of the pulley and adjoining a portion of the outer circumference of the pulley. The portion 72 may be varied in its length, that is, it may consist of one or more similar portions clamped or affixed to the upper surface of the pulley as shown. The length of portion 72 actually determines the size of the cruller or the amount of dough that shall be ejected for each operation. It is to be noted that arm 62 is mounted so that the end of arm 62 will be moved from its full line position (shown in Fig. 5) to its dotted line position when the cam element 72 contacts arm 62 during the rotation of pulley 70 and, of course, arm 62 is retained in the dotted position while the cam portion 72 passes thereby. It is to be further noted that a spring 73 mounted at one end in a fixed position to frame 57 and mounted at the opposite end to the arm 62 provides the force to return arm 62 to its original full line position after each passage of the cam 72. In order that arm 62 will return to a specific position, there is provided a stop element 74 with which the arm 62 will abut. Thus, in operation, the dough feeding device illustrated in Fig. 4, by means of the feed screw 55 continually rotating the dough 60 will be forced downward, and as long as the arm 62 is in the full line position as illustrated in Fig. 5, the dough will be forced through the open apertures 64 and 53 passing three portions of dough therethrough. However, with the motor driving the pulley 70 in a counterclockwise direction, the cam 72 will abut with arm 62 once for each rotation of pulley 70 and when the arm 62 is moved by cam 72 the apertures 64, 53 will not align and the dough 60 cannot be forced through the cut off valve or gate. As soon as the cam 72 has passed by arm 62, arm 62 will return to the position illustrated in Fig. 5 and again the apertures 64, 53 will be in alignment and dough 60 will again be ejected therethrough. It is to be noted that the feeding device 11 is mounted on wheels 9 on track 8 and may be rolled to one position for loading dough and moved to another position over the conveyor for feeding dough to be cooked.

It is apparent, referring to Fig. 1, that the motors, namely the motor driving the feed screw and the motors driving each of the three conveyors, may be controlled independently or may be connected to operate in unison. Either method will work satisfactorily as all of the motors are necessarily operated during the operation of this device. It is also to be noted, referring to Fig. 1, that the gas heaters may be operated separately with advantage, that is, the gas heater 20 may be first operated to change the shortening from a solid state to a fluid state and gas heater 20 may be reduced in its heat to the amount necessary to maintain the shortening in a fluid condition. Gas heaters 21 and 22 are necessarily started to maintain the shortening in a fluid condition. However, gas heater 21 and gas heater 22 may be controlled by separate thermostatic means T and T' as it may be advantageous to maintain gas heater 21 at a higher degree of heat because it is mounted under the deep fat portion of the tank while gas heater 22 may be maintained at a different temperature being under the shallow fat portion of the tank. At any rate a desired predetermined temperature should be maintained for the initial cooking operation and for the continuous cooking operation.

Although the device has been disclosed as a plurality of components connected in a particular order, it is apparent that the cruller dough mixture may be supplied from a different type of feeding device without departing from the spirit of this invention and the conveyors may be changed in their size, their length, or the particular angle of mounting without departing from the spirit of this invention, and the tank provided for retaining the shortening may be changed in its shape or its length without departing from the spirit of this invention and the manner of heating this device may be any form of heat, whether gas, electric or coal, without departing from the spirit of this invention, and the particular shortening, of course, may be varied as long as it provides the necessary fluid bath for the crullers during the cooking operation and the control and shut off device may be changed to provide one or more dough portions for the formation of crullers for each operation without departing from the spirit of this invention and this invention shall be limited only by the appended claims.

What is claimed is:

1. A continuously operated cruller producing machine which includes a predetermined timed cycle operated dough feeding device, a dough cut off device having a plurality of apertures to control the quantity and shape of dough for each cruller, a cooking tank filled with shortening, a first conveyor system to carry the cut off portions of dough into the shortening and a second conveyor the bottom surface of which carries the partially cooked crullers forward while submerged in said shortening through said tank during the cooking cycle and a third conveyor to carry the cooked cruller from the tank and eject the cruller from the machine, means to retain the shortening at a predetermined level that is at least up to the bottom surface of the second conveyor, in said tank.

2. In a device according to claim 1 in which the dough cut off device is comprised of a stationary supporting base element provided with a plurality of apertures and a cut off plate fitted into said base element and similarly provided with a plurality of similar shape and size apertures that may be aligned with the apertures in said base element at least in one position, means to oscillate said plate to move said apertures out of alignment for a predetermined cycle and means to return said plate to its initial position with the apertures in alignment to produce a continuous dropping of measured quantities of dough to produce a plurality of similar doughnuts.

3. In a device according to claim 1 in which said first conveyor system includes an operating belt that is driven about a pair of pulleys, said conveyor mounted in said tank so that one end will be above the normal level of the shortening in said tank while the opposite end is positioned well below the normal level of the shortening in said tank, the dough receiving areas of said conveyor belt divided into a plurality of spaced channels by a spacer element, means to catch the cut off dough on the surface of said belt and convey said cut off portions of dough into said shortening.

4. In a device according to claim 1 in which said second conveyor system comprises a belt driven about a pair of spaced pulleys and in which at least one surface of said belt moves slightly below the normal level of said shortening to carry said cooking dough while submerged, one end of said belt positioned adjacent to and above the submerged end of said first conveyor belt, and in which said belt surface retains said cut off portions of dough that have become the partially cooked crullers within said shortening for a predetermined cycle determined by the length of said belt and the speed of movement of said belt.

5. In a device according to claim 1 in which said shortening tank is comprised of three connected sections, the third portion being pitched away from said second portion to provide a draining and collecting section for all unused dough and foreign matter means to clean out said unused dough and foreign matter without emptying said shortening tank.

References Cited in the file of this patent

UNITED STATES PATENTS

| | | |
|---|---|---|
| 598,404 | Weichert | Feb. 1, 1898 |
| 1,440,663 | Dunn | Jan. 2, 1923 |
| 1,471,727 | Gomez | Oct. 23, 1923 |
| 1,776,781 | Carpenter | Sept. 30, 1930 |
| 1,814,930 | Hunter | July 14, 1931 |
| 1,823,409 | Roehl et al. | Sept. 15, 1931 |
| 1,868,183 | Sweet | July 19, 1932 |

FOREIGN PATENTS

| | | |
|---|---|---|
| 700,962 | Great Britain | Dec. 16, 1953 |